April 30, 1968  J. D. REGO  3,380,690
AIRCRAFT LANDING SYSTEM
Filed Dec. 15, 1966  3 Sheets-Sheet 2
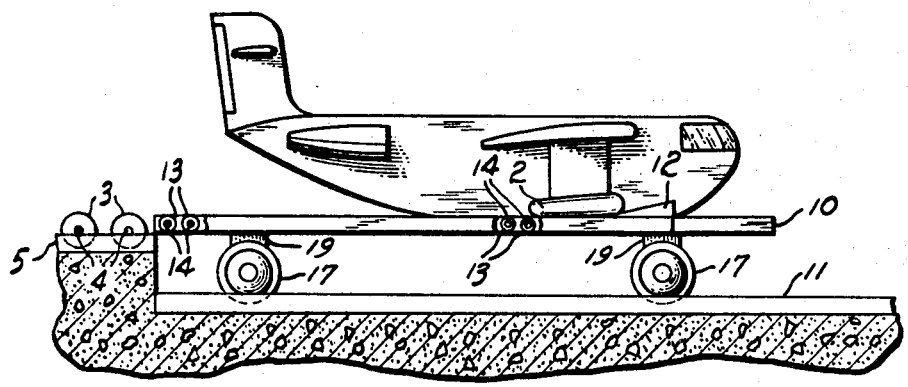
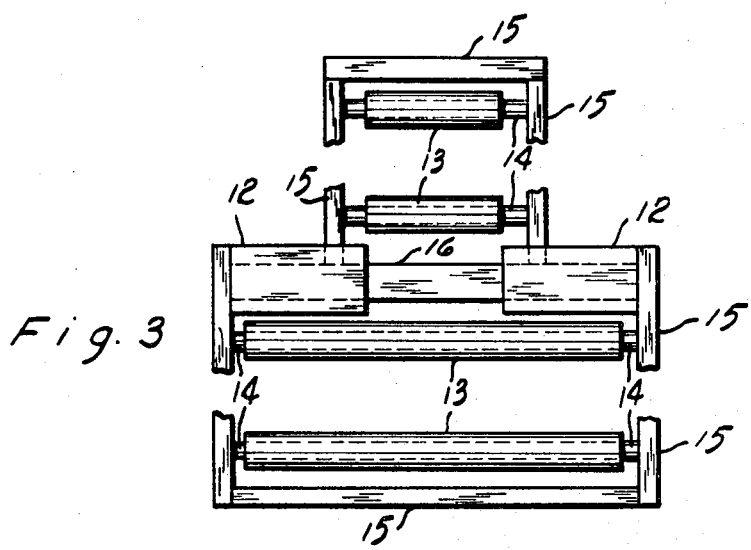
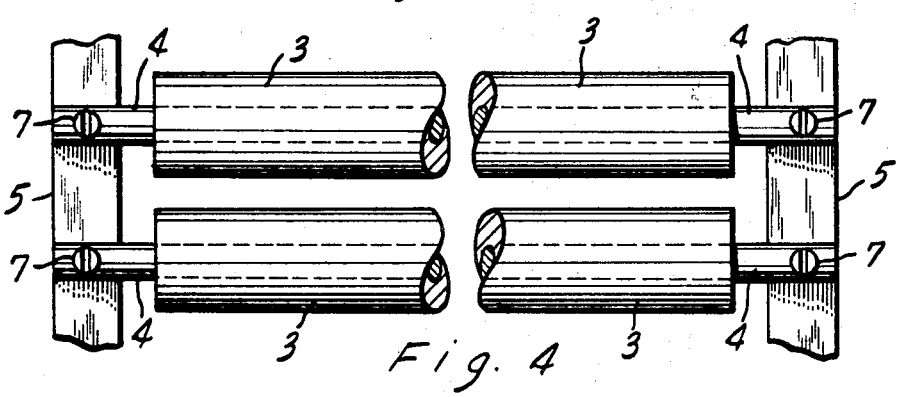

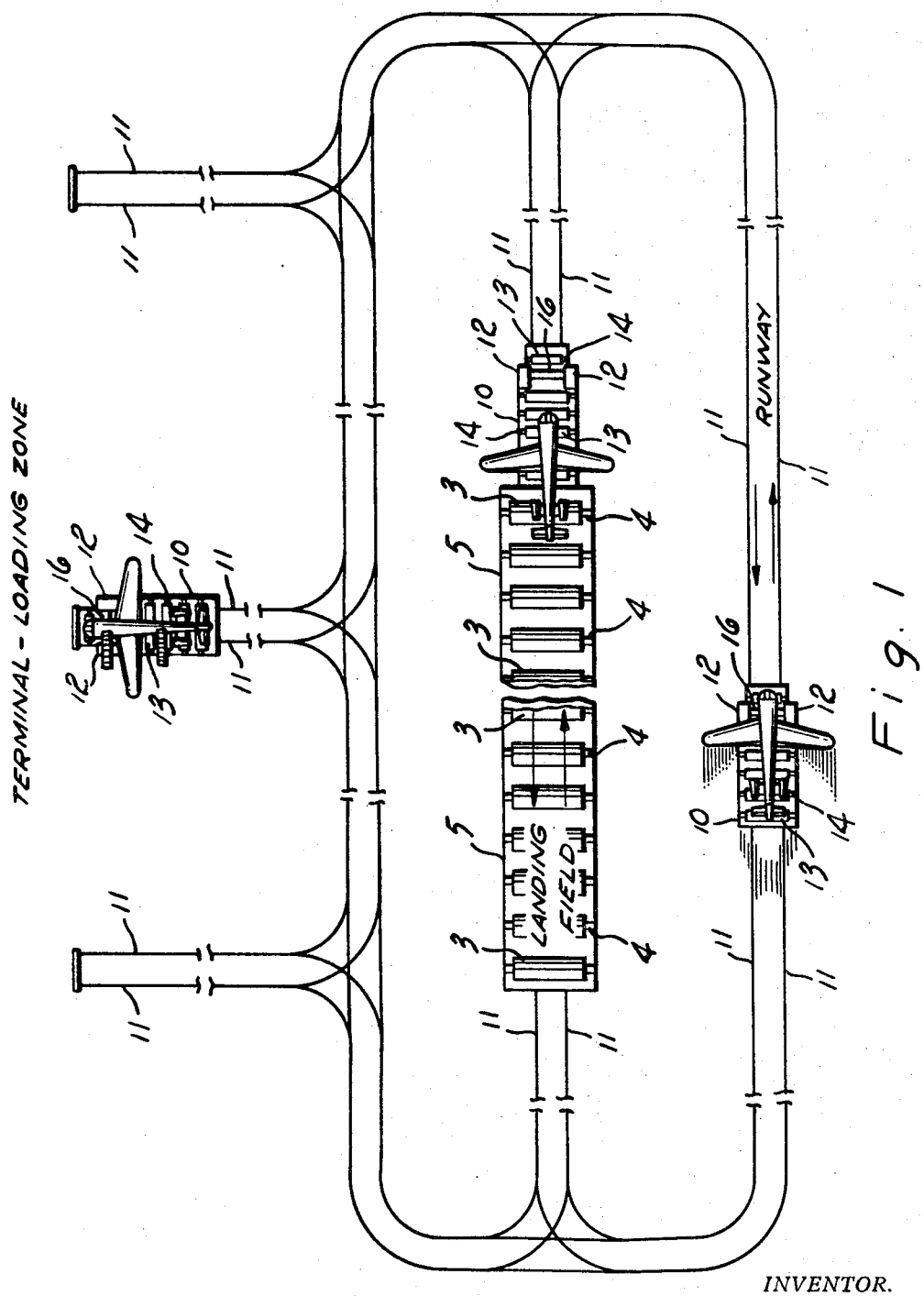

United States Patent Office 3,380,690
Patented Apr. 30, 1968

3,380,690
AIRCRAFT LANDING SYSTEM
José Domínguez Rego, 600 Broad St.,
Newark, N.J. 07102
Filed Dec. 15, 1966, Ser. No. 601,967
2 Claims. (Cl. 244—114)

ABSTRACT OF THE DISCLOSURE

An aircraft landing field comprising a plurality of spaced rollers upon which the aircraft is landed. A rail car, operating on rail tracks and provided with a plurality of rollers, is arranged to receive the landed aircraft for transport to and from other areas of the field and to facilitate its take-off.

The present invention is an improvement over that disclosed in my abandoned application Ser. No. 509,489, filed Nov. 24, 1965, and entitled, "Aircraft Landing System."

Background of the invention (1) The invention relates to an arrangement for the landing and take-off of aircraft, which arrangement eliminates the requirement for the present aircraft landing gear.

(2) In a conventional landing system, the aircraft carries its own landing gear. In modern, large, heavy aircraft, and the still larger and heavier ones of the future, the landing gear weighs several tons and constitutes a substantial part of the aircraft's lift-off weight. For example, the landing gear of a heavy air transport amounts to about 8 percent of its weight, empty, or about 15 percent of its structural weight. In an aircraft having a weight, empty, of 200,000 pounds, the landing gear weighs approximately 16,000 pounds. The elimination of the present landing gear results in an aircraft of simpler and cheaper construction and one which is easier, safer and more profitable to operate. In fact, this elimination could be the means by which operation of the planned supersonic transport and its advanced version could become highly profitable. This is due to the fact that the passenger load, which in today's jet aircraft is about 10 percent of the lift-off weight, will be about 7 percent in the supersonic transport and about 5 percent in the advanced version. The elimination of several tons of landing gear, therefore, will result in a substantial increase in the payload capacity and/or in the fuel carrying capacity. Also, the aircraft will be able to accelerate faster once it is airborne, as the drag of the landing gear, which exists until it is retracted, is eliminated, as well as the power required to retract the gear. Furthermore, the elimination of the landing gear eliminates the problems arising by reason of faulty operation thereof, and accidents, such as skidding and hydroplaning, as they exist on conventional runways.

Summary

A landing field made in accordance with this invention comprises a plurality of spaced, parallel rollers. A flat rail car, provided with a plurality of spaced, parallel rollers, is movable on rail tracks from the landing field to other areas of the airport. During the landing operation, the rail car is positioned at the far end of the landing field with its rollers parallel to and in the same plane as the rollers of the landing field. The bottom of the fuselage is brought down onto the landing field rollers and, upon reaching the end of the landing field, the aircraft moves onto the rollers of the rail car which carries fixed wedges engaged by the aircraft supporting surfaces when the aircraft has cleared the landing field. When the aircraft is supported by the landing field rollers it is decelerated by reversing its engines. Thereafter, the aircraft engines are utilized to move the rail car along the rail tracks to a desired zone of the airport. On take-off, the rail car is moved, under action of the engines of the supported aircraft, to a straight section of the rail tracks constituting a runway. Upon acceleration of the rail car to the aircraft lift-off speed, the aircraft becomes airborne.

An object of this invention is the provision of a landing and take-off system for aircraft, which system eliminates the need for landing gear on the aircraft.

An object of this invention is the provision of a landing and take-off system for aircraft, which system comprises a plurality of rollers constituting a landing field, a set of rail tracks extending from the ends of the landing field to other areas of an airport and including a straight section constituting a take-off runway, and a rail car movable on said rail tracks and carrying a plurality of rollers, said rail car including means for supporting an aircraft in a stable condition.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Brief description of the drawings

In the drawings wherein like reference characters denote like parts in the several views:

FIGURE 1 is a plan view of an air field made in accordance with this invention;

FIGURE 2 is a side elevational view showing an aircraft supported on the rail car;

FIGURE 3 is a fragmentary plan view of the rail car;

FIGURE 4 is a fragmentary plan view showing the rollers which constitute the landing area.

Description of preferred embodiment

Figure 5:
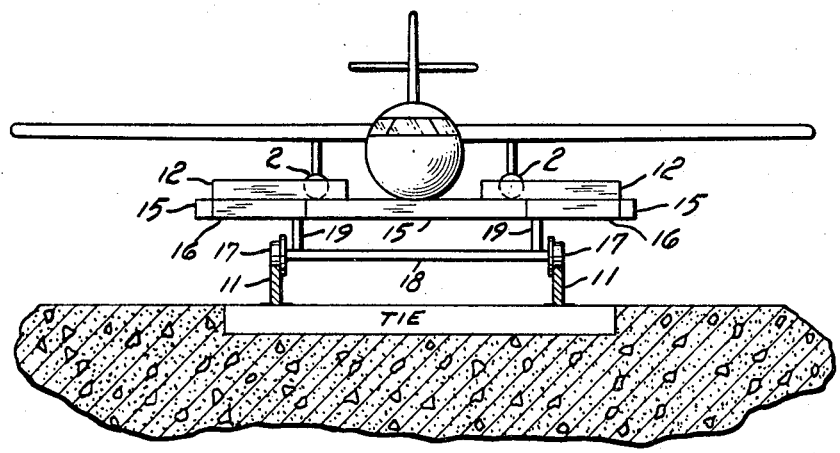
FIGURE 5 is a front elevational view showing the aircraft supported on the rail car.

Referring to the drawings, there is shown a landing field formed of a plurality of rollers 3 which preferably are made of a resilient material such as rubber. Each roller is mounted for free rotation about individual axles 4 having ends secured to side rails 5 by means of bolts 7. A flat rail car 10, made up of frame members 15 and cross bars 16, wheels 17, axles 18 and suspensions 19 is movable on rails 11 to various areas of the airport such as the terminal or loading zones. A straight section of the rail tracks constitutes a take-off runway. The loading surface of the rail car consists of a plurality of rollers 13 which preferably are made of a resilient material such as rubber, and rotatable about individual axles 14 which are fixed to the frame members 15. A pair of spaced wedges 12 are secured in fixed positions to a cross bar 16 carried by the frame members. As seen in FIGURE 2, the rails 11 are depressed so that the upper surfaces of the rollers 13, carried by the rail car, lie in the same plane as those of the landing field rollers 3.

During the landing operation, the rail car is aligned with the far end of the landing field. The aircraft approaches the landing field at its normal landing speed and the fuselage touches down on the rollers 3, which rollers rotate as the aircraft now moves over them. The aircraft is then slowed down by reversing the thrust of its engines and taxis, under its own power, onto the rollers of the rail car with the fuselage directed between the wedges 12. When the supporting surfaces 2 engage these wedges, the forward motion of the aircraft is halted. Wheel blocks, placed on the rail tracks, prevent forward movement of the rail car as the aircraft moves thereon. When the aircraft has come to rest on the rail car, other blocks are placed behind the supporting surfaces 2 to prevent relative movement between the aircraft and the rail car. The wheel blocks are then removed and the aircraft then taxis, under its own power, and supported on the rail car, over the rail tracks which interconnect the landing field, terminal and runway with each other through conventional railroad type switches.

To take off, the aircraft taxis on the rail car to the runway and then races along it. When the take-off speed is reached, the aircraft becomes airborne, leaving the rail car running along the rail tracks until it is halted by suitable automatic or remote control means.

The described landing system is particularly adapted for use by jet-powered aircraft, especially those having engines located on the fuselage, once minor modifications are made consisting mainly in the removal of the landing gear which no longer is required. Inasmuch as the landing field is required only for landing of the aircraft, its required length need be only a fraction of that of conventional runways. This limited length of the landing field should make the building of the airfield cheaper than a conventional airfield as most of the ground landing facilities will consist of rail tracks. By providing separate landing and take-off means, landings and take-offs can be effected simultaneously. Furthermore, if the length of the rail track crossing the landing field zone from the terminal is placed below ground level, aircraft can move to the runway without interference with or from landing aircraft. In a war zone, this landing system will provide an added service by enabling crippled aircraft whose landing gear has been damaged to land safely. Also, it will be increasingly difficult for the enemy to put the airfield out of action for a long period of time, damaged parts being easily repaired or replaced.

The landing system herein-described will free the aircraft designer from having to take into consideration taxying loads in the design of the wings, as the rail tracks provide a smooth ride free of vibration to the taxying aircraft. It will also simplify the design of pilotless aircraft by reason of the fact that provision for landing gear programming, steering on landing, taxying and take-offs will no longer be required.

It is relatively simple to provide a fire extinguishing system for the landing field by merely laying piping on the ground along the landing field rollers with branch-off pipes equipped with nozzles, the main purpose of the fire extinguishing system being to put out any fire caused by burning fuel spilled on the ground. The fire fighting system can also become a snow and sleet defrosting system by providing appropriate valves to enable the system to be switched from the fire-fighting chemical source to a steam source. Therefore, this landing system will be a virtually all-weather system as rain should not cause any difficulty if adequate drainage is provided. Keeping the runway free of snow or sleet is a relatively simple task compared to a conventional runway, as only the rail tracks need to be kept free of snow. The landing field can be kept free of snow and sleet as described above.

Having now described the invention those skilled in this art will be able to make various changes and modifications without thereby departing from the spirit and scope of the invention as recited in the following claims.

I claim:

1. An aircraft landing and take-off system comprising,
   (a) a first set of parallel, freely-rotatable rollers supported on the ground and constituting the landing field,
   (b) parallel rail tracks extending from each end of the landing field, said tracks including a straight section constituting a take-off runway, and
   (c) a flat rail car movable on said rail tracks, said car carrying fixed, stop members and a second set of parallel, freely-rotatable rollers lying in the same plane as the said first set of rollers, said rail car being movable into position at an end of the landing field so that an aircraft which has landed on the first set of rollers can taxi under its own power completely onto the second set of rollers and into engagement with the said stop members, and said rail car thereafter being movable under the power of the supported aircraft along the said runway for take-off of the aircraft.

2. The invention as recited in claim 1, wherein the said stop members are spaced apart and have inwardly-inclined surfaces, and wherein the aircraft includes support members disposed on opposite sides of the fuselage, which support members slide onto the inclined surfaces of the stop members.

References Cited

UNITED STATES PATENTS

| 2,135,033 | 11/1938 | Courtney | 244—63 |
| 2,358,426 | 9/1944 | Tompson | 244—114 |
| 2,425,886 | 8/1947 | Knox | 244—110 XR |
| 3,136,267 | 6/1964 | Kness | 244—114 XR |

FOREIGN PATENTS

| 592,717 | 2/1960 | Canada. |
| 657,658 | 1/1929 | France. |
| 835,594 | 9/1938 | France. |
| 578,420 | 6/1958 | Italy. |

FERGUS S. MIDDLETON, *Primary Examiner.*

P. E. SAUBERER, *Assistant Examiner.*